United States Patent
Fang et al.

(10) Patent No.: US 8,969,421 B2
(45) Date of Patent: Mar. 3, 2015

(54) SOLID DEFOAMING AGENT

(75) Inventors: Shao-Hai Fang, Hsin-Chu (TW);
Hey-Uan Wei, Hsin-Chu (TW)

(73) Assignee: AU Optronics Corporation, Hsin-Chu (TW)

(*) Notice: Subject to any disclaimer, the term of this patent is extended or adjusted under 35 U.S.C. 154(b) by 1934 days.

(21) Appl. No.: 11/842,204

(22) Filed: Aug. 21, 2007

(65) Prior Publication Data
US 2008/0119573 A1 May 22, 2008

(30) Foreign Application Priority Data

Nov. 21, 2006 (TW) .............................. 95143073 A

(51) Int. Cl.
*B01D 19/04* (2006.01)
*D21C 3/28* (2006.01)

(52) U.S. Cl.
CPC ......... *B01D 19/0404* (2013.01); *Y10S 435/812* (2013.01)
USPC ........... 516/123; 516/104; 516/105; 510/437; 510/491; 435/812

(58) Field of Classification Search
CPC ............................ B01D 19/04; B01D 19/0409
USPC .......... 516/123, 104, 105, 134; 510/347, 370, 510/437, 491; 435/812
See application file for complete search history.

(56) References Cited

U.S. PATENT DOCUMENTS

| | | | | |
|---|---|---|---|---|
| 2,041,197 A | * | 5/1936 | Lund | 426/659 |
| 2,381,368 A | * | 8/1945 | Ross | 510/451 |
| 2,740,760 A | * | 4/1956 | Pilch | 510/405 |
| 2,797,198 A | * | 6/1957 | Chappell, Jr. | 516/129 |
| 2,934,406 A | * | 4/1960 | Hotchkiss et al. | 423/309 |
| 4,652,392 A | * | 3/1987 | Baginski et al. | 510/438 |
| 4,719,034 A | * | 1/1988 | Yamada et al. | 516/117 |
| 4,961,877 A | * | 10/1990 | Shimizu et al. | 516/118 |

(Continued)

FOREIGN PATENT DOCUMENTS

| | | | | |
|---|---|---|---|---|
| JP | 58053997 A | * | 3/1983 | |
| JP | 61031460 A | * | 2/1986 | |

(Continued)

OTHER PUBLICATIONS

Product Information Silicone Antifoams, Dow Corning® Antifoam A Compound, DOW Corning Corp., (copyright 2001—month unavailable), obtained online @ http://www.dowcorning.com/applications/search/default.aspx?R=91EN, pp. 1-2.*

(Continued)

*Primary Examiner* — Daniel S Metzmaier
(74) *Attorney, Agent, or Firm* — McClure, Qualey & Rodack, LLP

(57) ABSTRACT

A method for producing a solid antifoaming agent comprising the following steps: providing an alkaline solution; adding an oil to the above alkaline solution to produce a saponification reaction; adding a liquid antifoaming agent; and putting aside the mixture containing the above alkaline solution, the oil and the liquid antifoaming agent to form the solid antifoaming agent. The ingredients of the solid antifoaming agent according to the present invention include 5~40 weight percent vegetable oil, a 20~40 weight percent sodium hydroxide solution and a 30~60 weight percent liquid antifoaming agent.

24 Claims, 4 Drawing Sheets

(56) References Cited

U.S. PATENT DOCUMENTS

| | | | | |
|---|---|---|---|---|
| 5,154,849 | A | * | 10/1992 | Visscher et al. .............. 510/150 |
| 5,935,917 | A | * | 8/1999 | Farrell et al. ................. 510/141 |
| 6,066,613 | A | * | 5/2000 | Tsaur et al. ................... 510/403 |
| 6,949,499 | B2 | * | 9/2005 | Lai et al. ....................... 510/441 |
| 2003/0211961 | A1 | * | 11/2003 | Lai et al. ....................... 510/475 |
| 2005/0277566 | A1 | * | 12/2005 | Grissett et al. ................ 510/438 |

FOREIGN PATENT DOCUMENTS

| | | |
|---|---|---|
| JP | 61-136406 C | 6/1986 |
| WO | WO 2006/045391 A1 * | 5/2006 |

OTHER PUBLICATIONS

Derwent Abstract on EAST, week 199544, London: Derwent Publications Ltd., AN 1989-070196, Class A25, JP 01-058307 A, (DOW Corning KK), abstract.*

Derwent Abstract on EAST, week 198319, London: Derwent Publications Ltd., AN 1983-44994K, Class D25, JP 58053997 A, (Miyazaki S), abstract.*

Derwent Abstract on EAST, week 198613, London: Derwent Publications Ltd., AN 1986-084996, Class A26, JP 61031460 A, (Lion Corp), abstract.*

English Translation PTO-10-5555, Lion Corporation, JP S61-31460, USPTO, Alexandria, VA, USA, (Aug. 2010).*

English Translation PTO-10-5563, Seiichi Miyazaki, JP S58-053997, USPTO, Alexandria, VA, USA, (Aug. 2010).*

Lewis, Richard J., Sr. (2002) Hawley's Condensed Chemical Dictionary (14th Edition), John Wiley & Sons (Knovel Release Sep. 4, 2003) Online @ http://knovel.com/web/portal/browse/display?_EXT_KNOVEL_DISPLAY_bookid=704&VerticalID=0 , headwords: "agar", "carageenan", "activated carbon", "carbon, activated".*

English language translation of abstract of JP2059766 (C) (published Jun. 10, 1996, obtained from espacenet), Online @ http://v3.espacenet.com/.

English language translation of abstract of JP 61-136406(C) (published Jun. 24, 1986, obtained from espacenet), Online @ http://v3.espacenet.com/.

* cited by examiner

SOLID DEFOAMING AGENT

BACKGROUND OF THE INVENTION

1. Field of the Invention

The present invention relates generally to defoaming/antifoaming agents, and more particularly to a solid antifoaming agent and manufacturing method thereof.

2. Description of the Prior Art

Defoaming/Antifoaming agents are mainly used in chemical industry (resin synthesis), wastewater industry, petroleum industry, pulp and paper industry, paint & coating industry, fiber industry, medicine and pharmaceutical industry, fermentation industry, food factories and other related industries. The current antifoaming agents are grouped into water-based antifoaming agents, oil-based antifoaming agents, solvent-based antifoaming agents and self-emulsifying antifoaming agents. Antifoaming agents achieve the effect of foam elimination by reducing the surface tension of a liquid, and suppress foam generation simultaneously.

All traditional antifoaming agents exist in the liquid state, and most of them are ivory-color thick liquid. Consequently, when used in wastewater treatment, the following drawbacks occur frequently. First, the inherent thick characteristic of antifoaming agents makes pumps and pipes of related equipments easily clogged, and thus operators in wastewater treatment plants need to clean up regularly. Second, since there is usually quite a distance or an elevation drop between wastewater treatment equipments and discharge points, in order to avoid losing efficacy of antifoaming agents, higher quantity or more expensive long-acting antifoaming agents are often used, hence it is difficult to control foam elimination effect, and results in an increased operation cost for wastewater treatment plants.

SUMMARY OF THE INVENTION

In the light of the drawbacks of conventional antifoaming agents, it is an object of the present invention to provide a solid defoaming/antifoaming anent.

It is another object of the present invention to reduce the required amount of antifoaming agents under the same circumstances.

It is a further object of the present invention to provide a solid antifoaming agent that could reduce operation cost, human labors and time.

The present invention provides a solid antifoaming agent manufacturing method comprising the following steps: preparing an alkaline solution; adding an oil to the alkaline solution to produce a saponification reaction; adding a liquid antifoaming agent; and putting aside the mixture containing the alkaline solution, the oil and the liquid antifoaming agent to form the solid antifoaming agent of the present invention. The alkaline solution preparing step includes preparing 25~60% sodium hydroxide solution and cooling the sodium hydroxide solution to under 50° C.

The liquid antifoaming agent adding step includes adding a silicone antifoaming agent. The oil adding step includes heating 5~40 weight percent vegetable oil to about 50° C., adding the sodium hydroxide solution to produce a first mixture, stirring and cooling the first mixture to under 50° C. The first mixture producing step includes stirring until no bubbles are observed.

The vegetable oil includes 10~20 weight percent coconut oil and 5~10 weight percent palm oil. The liquid antifoaming agent adding step includes adding 30~60 weight percent liquid antifoaming agent into the first mixture, and stirring well to form a second mixture. The preferred embodiment of the present invention includes 30 weight percent sodium hydroxide solution, 20 weight percent vegetable oil and 45 weight percent liquid antifoaming agent.

The solid antifoaming agent manufacturing method according to the present invention further comprises adding 5~20 weight percent water into 2~5 weight percent agar to produce an agar solution, heating the agar solution until the solution becomes thick, adding slowly the agar solution and 1~3 weight percent powdered activated carbon into the second mixture and stirring well. The above agar includes a carrageenan.

The present invention also provides a solid antifoaming agent having the following compositions: 5~40 weight percent vegetable oil, 20~40 weight percent sodium hydroxide solution and 30~60 weight percent liquid antifoaming agent. The aforementioned vegetable oil includes 10~20 weight percent coconut oil and 5~10 weight percent palm oil, and the liquid antifoaming agent includes a silicone antifoaming agent.

The solid antifoaming agent in accordance with the present invention further comprises 2~5 weight percent agar and 1~3 weight percent powdered activated carbon, and the agar includes a carrageenan. In the preferred embodiment, the solid antifoaming agent of the present invention comprises 20 weight percent vegetable oil, a 30 weight percent sodium hydroxide solution and 45 weight percent liquid antifoaming agent.

DETAILED DESCRIPTION OF THE PREFERRED EMBODIMENT

Defoaming/Antifoaming agents are a repeat chemical engineering product with a wide variety of applications used in textile, printing and dyeing, pulp and paper, food, chemical engineering, petroleum, leather, cleaning, wastewater treatment and related fields. Antifoaming agents not only have fast foam elimination and long-duration foam suppression capabilities, but also other numerous advantages, such as wide applications, low cost, easy production, small investment in equipments, short production cycle, no environmental pollution and considerable profit.

Figure 1:
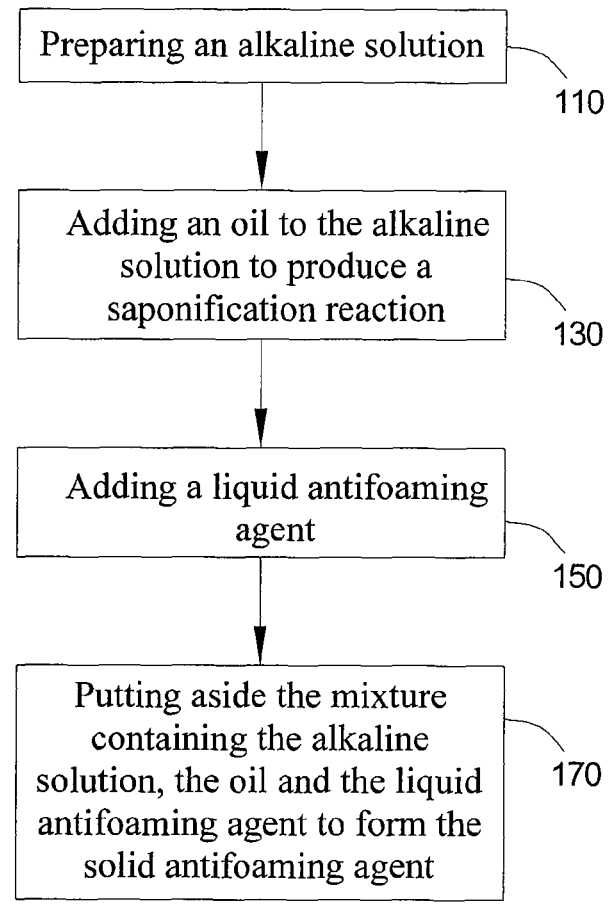
FIG. 1 is a flow chart of the manufacturing method of the solid defoaming/antifoaming agent in accordance with one embodiment of the present invention.

The present invention provides a solid antifoaming agent and manufacturing method thereof. As shown in FIG. 1, the manufacturing method of the solid antifoaming agent in accordance with the present invention comprises at least four main steps: step 110 is preparing an alkaline solution; step 130 is adding an oil to the alkaline solution to produce a saponification reaction; step 150 is adding a liquid antifoaming agent; and step 170 is putting aside the mixture containing the alkaline solution, the oil and the liquid antifoaming agent to form the solid antifoaming agent. The uniqueness of the solid antifoaming agent manufacturing method according to the present invention is in employing a saponification reaction to turn a liquid antifoaming agent into a solid antifoaming agent, and all inherent drawbacks of the liquid antifoaming agent are thus eliminated.

Figure 2:
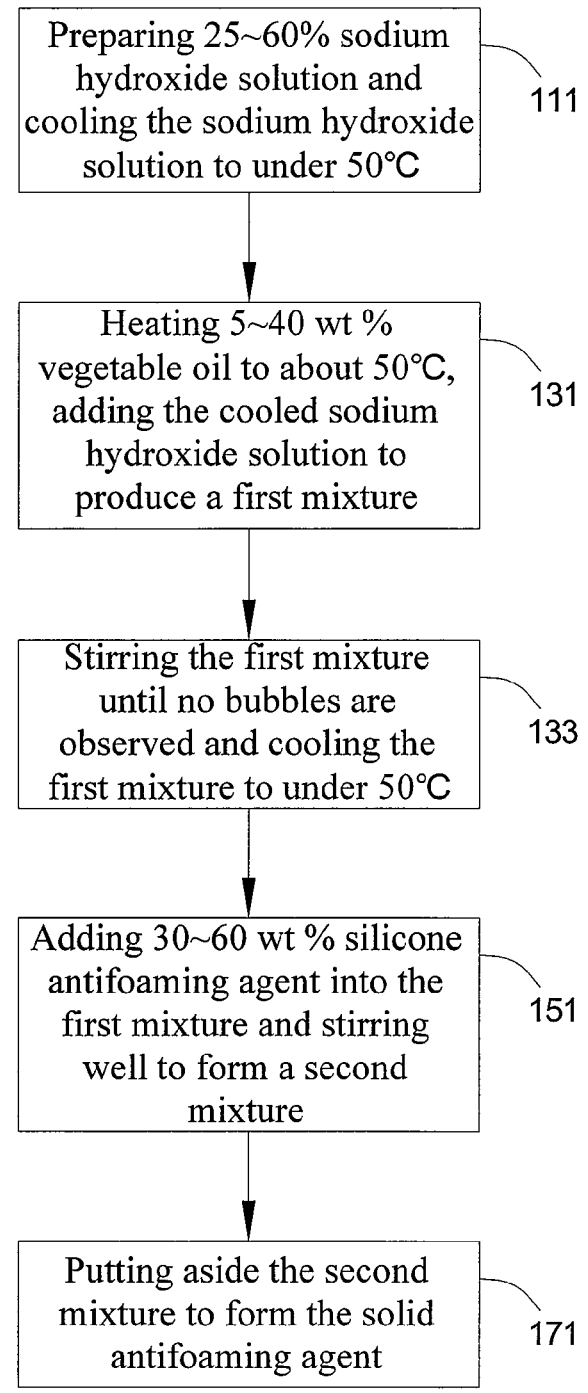
FIG. 2 is a flow chart of the manufacturing method of the solid antifoaming agent in accordance with another embodiment of the present invention.

FIG. 2 shows a flow chart of the manufacturing method of the solid antifoaming agent according to another embodiment of the present invention. As shown in the figure, the above alkaline solution preparing step 110 further includes a step 111: preparing a 25~60% sodium hydroxide solution and cooling the sodium hydroxide solution to under 50° C. However, in other embodiments, the alkaline solution may include a potassium hydroxide solution. Moreover, the above oil adding step 130 further includes a step 131: heating 5~40 weight percent vegetable oil to about 50° C., and adding the above cooled sodium hydroxide solution to produce a saponification reaction and a first mixture. However, in other embodiments, the oil may include animal fat, such as lard, cow fat, goat fat and other suitable animal fat. Other vegetable oils including coconut oil, palm oil, olive oil, sunflower oil, mustard oil and other suitable vegetable oil may also be used. Next is to perform step 133, stirring the first mixture until no bubbles are observed, and cooling the first mixture to under 50° C.

As shown in FIG. 2, the liquid antifoaming agent adding step 150 further includes a step 151: when the temperature of the first mixture falls below 50° C. and the mixture becomes thick, 30~60 weight percent silicone antifoaming agent is added into the first mixture and stirred well to form a second mixture. In this step, other types of antifoaming agents may replace the silicone antifoaming agent, such as water-based antifoaming agents, solvent-based antifoaming agents and self-emulsifying antifoaming agents, etc. Next is to perform the final step in FIG. 2, putting aside and cooling the second mixture to form the solid antifoaming agent 171.

With reference to silicone antifoaming agents, silicone type has widest variety of applications and best effect among common antifoaming agents on the market. The silicone type antifoaming agents are grouped into silicone fluid, silicone fluid surfactant, silicone compound and self-emulsifying silicone oil. Among silicone antifoaming agents, silicone fluid surfactants are preferably used in wastewater treatment systems, as slow foam breaking rate but good foam suppression effect, suitable for low to mid temperature (room temperature to 50° C.) and resistant to both acid and alkaline solution environment are characteristic of these silicone fluid surfactants.

In addition, in order to speed up the reaction, or to shorten about 20 days of the reaction time to less than a week to increase production efficiency and economic profit, agar and powdered activated carbon are preferably added in the process of producing solid antifoaming agents. However, in other embodiments, the agar and powdered activated carbon may be replaced by other substances having similar effect. The agar is poured into the above second mixture only after water is added into the agar and the agar solution is heated, namely after the step 151 in FIG. 2.

Figure 3:
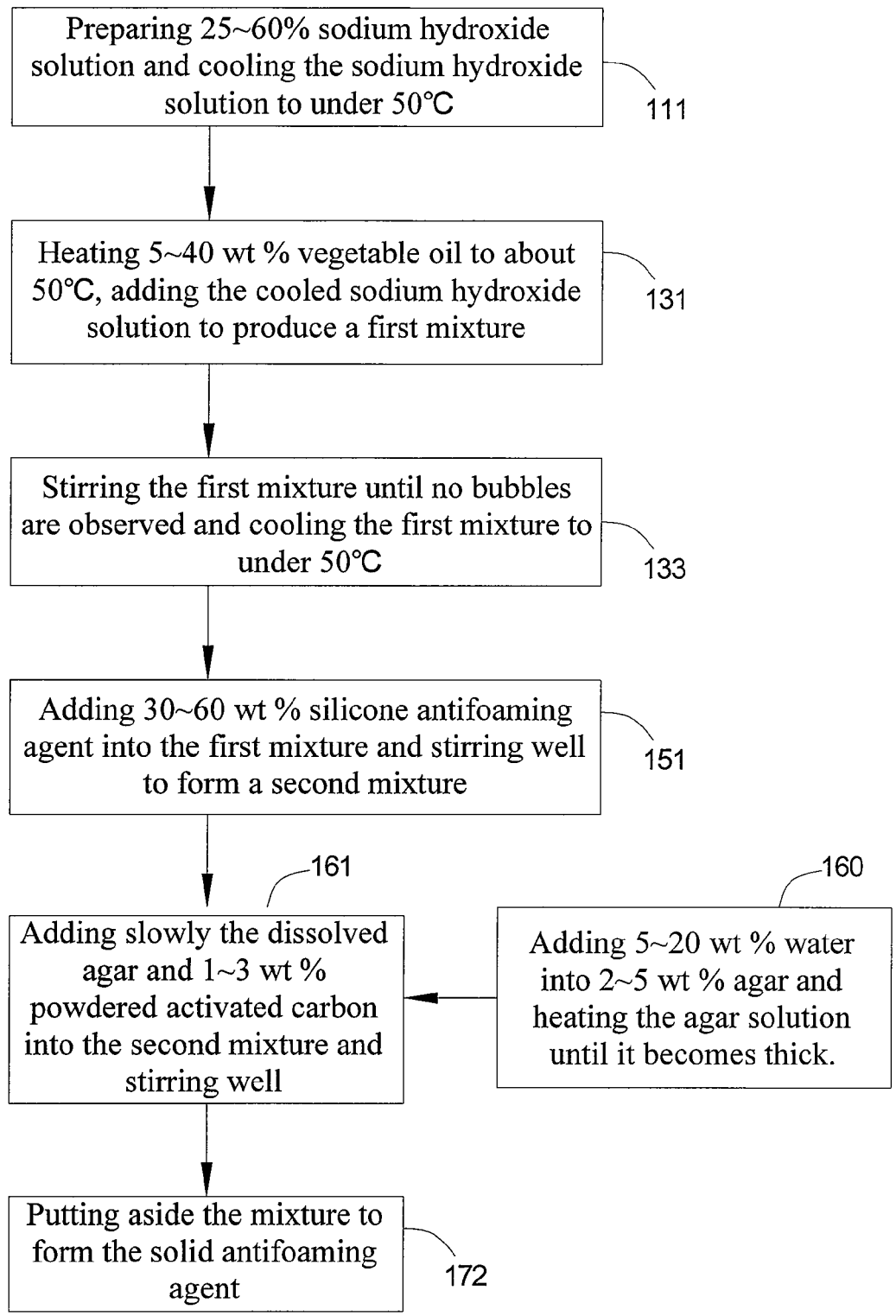
FIG. 3 is a flow chart of the manufacturing method of the solid antifoaming agent in accordance with a further embodiment of the present invention.

As shown in FIG. 3, the method preferably includes step 160: adding 5~20 weight percent water into 2~5 weight percent agar to produce an agar solution, and heating the agar solution until the solution becomes thick. Then adding slowly the dissolved agar into the above second mixture to produce a third mixture, and then adding 1~3 weight percent powdered activated carbon into the above third mixture and stirring well in step 161 to produce a fourth mixture. It shall be understood that in other embodiments, either the agar solution or activated carbon may be used alone, so they are not required to be used together. Next is to perform step 172: putting aside and cooling the mixture containing the agar, powdered activated carbon and the second mixture for several days to form the solid antifoaming agent.

Figure 4:
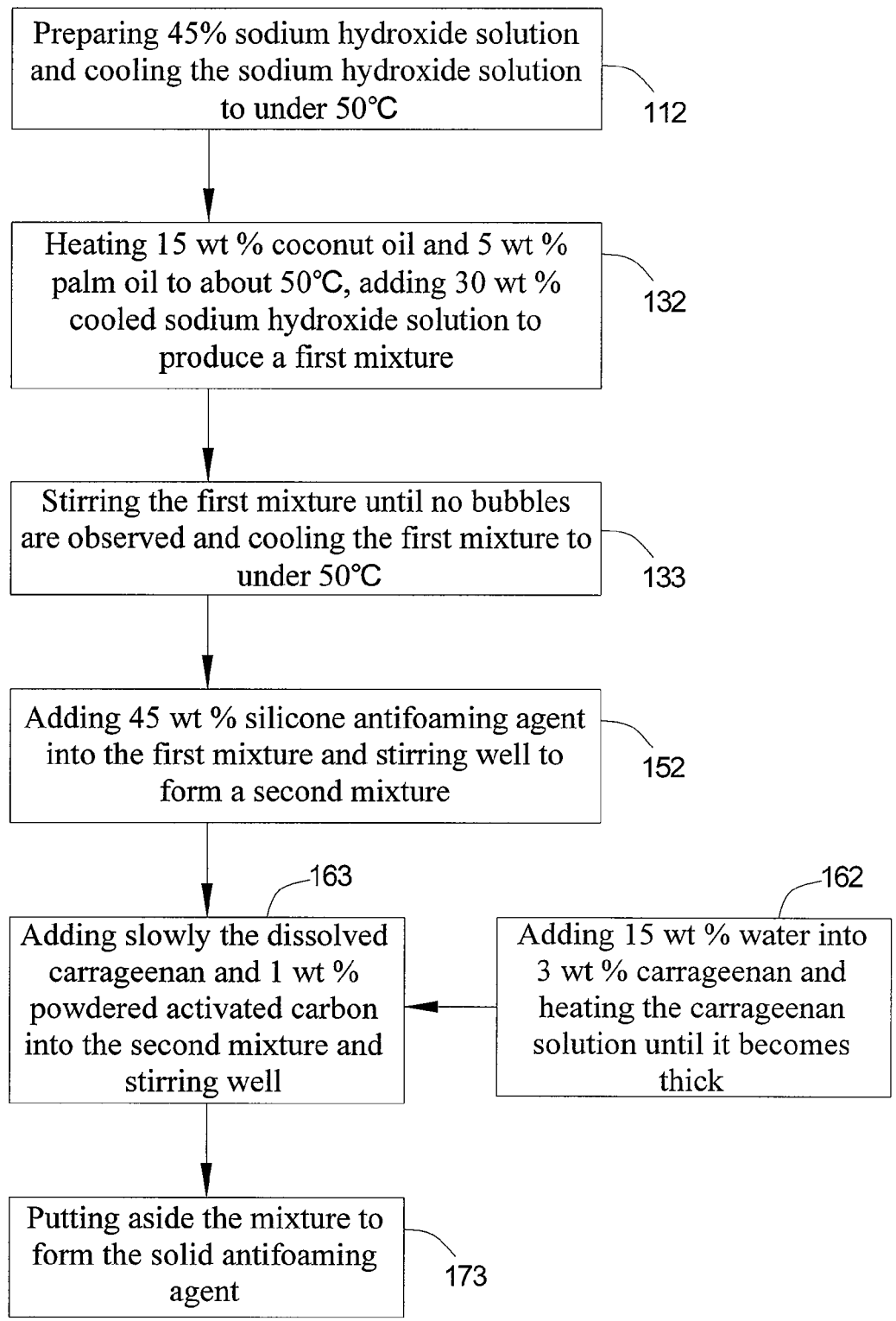
FIG. 4 is a flow chart of the manufacturing method of the solid antifoaming agent in accordance with yet another embodiment of the present invention.

As described above, in order to shorten the reaction time, agar and powdered activated carbon are added accordingly. In the preferred embodiment, as shown in FIG. 4, the agar primarily includes carrageenan. And the preferable weight percentage of each composition in this step is 3 weight percent carrageenan, 15 weight percent water and 1 weight percent powdered activated carbon. Generally speaking, the second mixture after adding carrageenan and powdered activated carbon will turn into a solid antifoaming agent after putting aside and let it cool for about six days. However, in other embodiments, in addition to carrageenan, the agar may include gelatin, xanthan gum, konjac glucomannan, Arabic gum, sodium alginate and other similar gelatins. Furthermore, beeswax may replace powdered activated carbon.

In the preferred embodiment of the present invention, as shown in FIG. 4, each essential composition of the solid antifoaming agent has the following weight percentage: 30 weight percent sodium hydroxide solution, 20 weight percent vegetable oil and a 45 weight percent liquid antifoaming agent. Moreover, the 20 weight percent vegetable oil preferably includes a combination of 15 weight percent coconut oil and 5 weight percent palm oil. These particular weight percentages will achieve more desirable condition of the solid antifoaming agent, such as the proper size and hardness. Furthermore, due to the fact that it is rare and more difficult to prepare a sodium hydroxide solution at a concentration greater than 50%, a 45% sodium hydroxide solution is made in the preferred embodiment. However, a sodium hydroxide solution with concentration greater than 50% may still be used in the manufacturing method of the solid antifoaming agent in accordance with the present invention.

In short, in the preferred embodiment of the present invention, as shown in FIG. 4, the solid antifoaming agent manufacturing method comprises step 112: preparing the 45% sodium hydroxide solution and cooling the sodium hydroxide solution to under 50° C. Next is to perform step 132: heating the 15 weight percent coconut oil and the 5 weight percent palm oil, and adding the above cooled 30 weight percent sodium hydroxide solution to produce the first mixture. Then is to perform step 133, stirring the first mixture until no bubbles are observed, and cooling the first mixture to under 50° C. Then is to perform step 152: adding the 45 weight percent silicone antifoaming agent into the first mixture and stirring well to form a second mixture. Then is to perform step 162, adding the 15 weight percent water into the 3 weight percent carrageenan and heating the carrageenan solution until it becomes thick. Then adding slowly the dissolved carrageenan and 1 weight percent powdered activated carbon into the second mixture and stirring well in step 163. Next is to perform the final step 173 in FIG. 4: putting aside the mixture containing the agar, powdered activated carbon and the second mixture for several days to form the solid antifoaming agent.

The solid antifoaming agent produced in the preferred embodiment of the present invention preferably has the following characteristic: the color is close to ivory color, the specific gravity is between 1.05~1.1, the pH value is between 7.5 and 9.0, the suitable water temperature range for application is between 5° C. and 45° C., and the dissolving rate is between 10 ml/hr (milliliter per hour) and 40 ml/hr.

From the foregoing, it shall be appreciated that specific embodiments in accordance with the invention have been described herein for purposes of illustration, but that various modifications and alterations may be made by those skilled in the art without deviating from the spirit and scope of the invention. Accordingly, the invention is not limited except as by the appended claims.

What is claimed is:

1. A solid antifoaming agent manufacturing method comprising the following steps:
    preparing an alkaline solution;
    adding an oil to said alkaline solution to produce a first mixture with a saponification reaction;
    adding a liquid antifoaming agent to said first mixture to produce a second mixture;
    adding an agar to said second mixture containing said alkaline solution, said oil and said liquid antifoaming agent to produce a third mixture; and
        putting aside said third mixture containing said alkaline solution, said oil, said liquid antifoaming agent and said agar to form said solid antifoaming agent;
        wherein said liquid antifoaming agent adding step includes adding 30~60 weight percent liquid antifoaming agent based on weight of total compositions of the solid antifoaming agent.

2. The solid antifoaming agent manufacturing method of claim 1, wherein said liquid antifoaming agent adding step includes adding a silicone antifoaming agent.

3. The solid antifoaming agent manufacturing method of claim 1, wherein said alkaline solution preparing step includes preparing 25%~60% by weight sodium hydroxide solution and cooling said sodium hydroxide solution to under 50° C.

4. The solid antifoaming agent manufacturing method of claim 3, wherein said adding an oil step includes adding 5~40 weight percent vegetable oil heated to about 50° C. to said sodium hydroxide solution to produce said first mixture, stirring and cooling said first mixture to under 50° C.

5. The solid antifoaming agent manufacturing method of claim 4, wherein said first mixture producing step further comprises stirring until no bubbles are observed.

6. The solid antifoaming agent manufacturing method of claim 4, wherein said vegetable oil includes 10~20 weight percent coconut oil and 5~10 weight percent palm oil based on total compositions of the solid antifoaming agent.

7. The solid antifoaming agent manufacturing method of claim 4, wherein said liquid antifoaming agent adding step includes adding 30~60 weight percent liquid antifoaming agent to said first mixture, and stirring well to form said second mixture.

8. The solid antifoaming agent manufacturing method of claim 7, wherein said sodium hydroxide solution includes 30 weight percent sodium hydroxide solution, said vegetable oil includes 20 weight percent vegetable oil, and said liquid antifoaming agent includes 45 weight percent liquid antifoaming agent.

9. The solid antifoaming agent manufacturing method of claim 7, wherein adding said agar further comprising adding 5~20 weight percent water into 2~5 weight percent agar to produce an agar solution and heating said agar solution until said agar solution is thick; wherein the 5~20 weight percent and the 2~5 weight percent are based on the weight of the total compositions of the solid antifoaming agent.

10. The solid antifoaming agent manufacturing method of claim 9, wherein adding said agar further comprising adding slowly said agar solution into said second mixture to form said third mixture, wherein said agar is 2~5 weight percent of said third mixture and said water in said agar solution is 5~20 weight percent of said third mixture.

11. The solid antifoaming agent manufacturing method of claim 10, further comprising adding slowly 1~3 weight percent powdered activated carbon (PAC) into said second mixture and stirring well.

12. The solid antifoaming agent manufacturing method of claim 9, wherein said agar includes a carrageenan.

13. A solid antifoaming agent manufacturing method comprising the following steps:
    preparing an alkaline solution;
    adding an oil to said alkaline solution to produce a first mixture with a saponification reaction;
    adding a liquid antifoaming agent to said first mixture to produce a second mixture;
    shortening the reaction time of said second mixture containing said alkaline solution, said oil and said liquid antifoaming agent by adding an agar and powdered activated carbon (PAC) to said second mixture to produce a fourth mixture; and
        putting aside said fourth mixture containing said alkaline solution, said oil, said liquid antifoaming agent, said agar and said powdered activated carbon (PAC) to form said solid antifoaming agent;
        wherein said liquid antifoaming agent adding step includes adding 30~60 weight percent liquid antifoaming agent based on weight of total compositions of the solid antifoaming agent.

14. The solid antifoaming agent manufacturing method of claim 13, wherein said liquid antifoaming agent adding step includes adding a silicone antifoaming agent.

15. The solid antifoaming agent manufacturing method of claim 13, wherein said alkaline solution preparing step includes preparing 25%~60% by weight sodium hydroxide solution and cooling said sodium hydroxide solution to under 50° C.

16. The solid antifoaming agent manufacturing method of claim 15, wherein said adding an oil step includes adding 5~40 weight percent vegetable oil heated to about 50° C. to said sodium hydroxide solution to produce said first mixture, stirring and cooling said first mixture to under 50° C.

17. The solid antifoaming agent manufacturing method of claim 16, wherein said first mixture producing step further comprises stirring until no bubbles are observed.

18. The solid antifoaming agent manufacturing method of claim 16, wherein said vegetable oil includes 10~20 weight percent coconut oil and 5~10 weight percent palm oil based on total compositions of the solid antifoaming agent.

19. The solid antifoaming agent manufacturing method of claim 16, wherein said liquid antifoaming agent adding step includes adding 30~60 weight percent liquid antifoaming agent to said first mixture, and stirring well to form said second mixture.

20. The solid antifoaming agent manufacturing method of claim 19, wherein said sodium hydroxide solution includes 30 weight percent sodium hydroxide solution, said vegetable oil includes 20 weight percent vegetable oil, and said liquid antifoaming agent includes 45 weight percent liquid antifoaming agent.

21. The solid antifoaming agent manufacturing method of claim 19, wherein said adding said agar and powdered activated carbon (PAC) step further comprises adding 5~20 weight percent water into 2~5 weight percent agar to produce an agar solution and heating said agar solution until said agar solution is thick wherein said 5~20 weight percent and said 2~5 weight percent are based on the weight of the total compositions of the solid antifoaming agent.

22. The solid antifoaming agent manufacturing method of claim 21, wherein said agar includes a carrageenan.

23. The solid antifoaming agent manufacturing method of claim 21, wherein said adding said agar and powdered activated carbon (PAC) step further comprises adding slowly said agar solution into said second mixture to form a third mixture.

24. The solid antifoaming agent manufacturing method of claim 23, wherein said adding said agar and powdered activated carbon (PAC) step further comprises adding slowly 1~3 weight percent powdered activated carbon (PAC) into said third mixture and stirring well to form said fourth mixture; wherein said 1~3 weight percent is based on the weight of the total compositions of the solid antifoaming agent.

* * * * *